United States Patent
Dvijotham et al.

(10) Patent No.: US 11,847,414 B2
(45) Date of Patent: Dec. 19, 2023

(54) ROBUSTNESS TO ADVERSARIAL BEHAVIOR FOR TEXT CLASSIFICATION MODELS

(71) Applicant: DeepMind Technologies Limited, London (GB)

(72) Inventors: Krishnamurthy Dvijotham, London (GB); Anton Zhernov, London (GB); Sven Adrian Gowal, Cambridge (GB); Conrad Grobler, London (GB); Robert Stanforth, Dorking (GB)

(73) Assignee: DeepMind Technologies Limited, London (GB)

( * ) Notice: Subject to any disclaimer, the term of this patent is extended or adjusted under 35 U.S.C. 154(b) by 342 days.

(21) Appl. No.: 17/239,284

(22) Filed: Apr. 23, 2021

(65) Prior Publication Data

US 2021/0334459 A1    Oct. 28, 2021

Related U.S. Application Data

(60) Provisional application No. 63/015,358, filed on Apr. 24, 2020.

(51) Int. Cl.
*G06F 40/279* (2020.01)
*G06F 40/247* (2020.01)
(Continued)

(52) U.S. Cl.
CPC .......... *G06F 40/279* (2020.01); *G06F 40/166* (2020.01); *G06F 40/247* (2020.01); *G06N 5/04* (2013.01); *G06N 20/00* (2019.01)

(58) Field of Classification Search
CPC .......... G06N 5/04; G06N 20/00; G06N 3/044; G06N 3/084
See application file for complete search history.

(56) References Cited

U.S. PATENT DOCUMENTS

| | | | |
|---|---|---|---|
| 10,528,866 B1 * | 1/2020 | Dai | G06N 3/044 |
| 2012/0253792 A1 * | 10/2012 | Bespalov | G06F 16/353 704/9 |

(Continued)

OTHER PUBLICATIONS

Jia et al. "Certified Robustness to Adversarial Word Substitutions". arXiv:1909.00986v1 [cs.CL] Sep. 3, 2019 (Year: 2019).*

(Continued)

*Primary Examiner* — Jesse S Pullias
(74) *Attorney, Agent, or Firm* — Fish & Richardson P.C.

(57) ABSTRACT

Methods, systems, and apparatus, including computer programs encoded on computer storage media, for training a text classification machine learning model. One of the methods includes training a model having a plurality of parameters and configured to generate a classification of a text sample comprising a plurality of words by processing a model input that includes a combined feature representation of the plurality of words in the text sample, wherein the training comprises receiving a text sample and a target classification for the text sample; generating a plurality of perturbed combined feature representations; determining, based on the plurality of perturbed combined feature representations, a region in the embedding space; and determining an update to the parameters based on an adversarial objective that encourages the model to assign the target classification for the text sample for all of the combined feature representations in the region in the embedding space.

20 Claims, 3 Drawing Sheets

(51) Int. Cl.
*G06N 5/04* (2023.01)
*G06N 20/00* (2019.01)
*G06F 40/166* (2020.01)

(56) References Cited

U.S. PATENT DOCUMENTS

2017/0308790 A1* 10/2017 Nogueira dos Santos ............... G06N 3/045
2019/0171913 A1* 6/2019 Cheng ...................... G06N 5/01
2021/0034707 A1* 2/2021 Podgorny ........... G06F 16/3349

OTHER PUBLICATIONS

Liang et al. "Deep Text Classification Can be Fooled". Proceedings of the Twenty-Seventh International Joint Conference on Artificial Intelligence (IJCAI-18), pp. 4208-4215 (Year: 2018).*

Ebrahimi, Javid. "Robustness of Neural Networks for Discrete Input: An Adversarial Perspective". URI: http://hdl.handle.net/1794/24535 Date: Apr. 30, 2019 (Year: 2019).*

Chazelle et al., "An optimal convex hull algorithm in any fixed dimension," Discrete & Computational Geometry, Dec. 1993, 10(4):377-409.

DeepMind.com [online], "Identifying and eliminating bugs in learned predictive models," Mar. 2019, retrieved on May 14, 2021, retrieved from URL<https://deepmind.com/blog/article/robust-and-verified-ai>, 12 pages.

Ebrahimi et al., "Hotflip: White-box adversarial examples for text classification," arXiv, Dec. 2017, 6 pages.

Huang et al., "Achieving verified robustness to symbol substitutions via interval bound propagation," arXiv, Sep. 2019, 14 pages.

Mikolov et al., "Efficient estimation of word representations in vector space," arXiv, Jan. 2013, 12 pages.

Pennington et al., "Glove: Global vectors for word representation," Proceedings of the 2014 Conference on Empirical Methods in Natural Language Processing (EMNLP), Doha, Qatar, Oct. 25-29, 2014, Oct. 2014, 12 pages.

Sartipizadeh et al., "Computing the approximate convex hull in high dimensions," arXiv, Mar. 2016, 5 pages.

Security.GoogleBlog.com [online], "Combating Potentially Harmful Applications with Machine Learning at Google: Datasets and Models," Nov. 2018, retrieved on May 14, 2021, retrieved from URL<https://security.googleblog.com/2018/11/combating-potentially-harmful_14.html>, 8 pages.

Security.GoogleBlog.com [online], "Keeping 2 billion Android devices safe with machine learning," May 2018, retrieved on May 14, 2021, retrieved from URL<https://security.googleblog.com/2018/05/keeping-2-billion-android-devices-safe.html>, 5 pages.

* cited by examiner

ROBUSTNESS TO ADVERSARIAL BEHAVIOR FOR TEXT CLASSIFICATION MODELS

CROSS-REFERENCE TO RELATED APPLICATION

This application claims priority to U.S. Provisional Application No. 63/015,358, filed on Apr. 24, 2020. The disclosure of the prior application is considered part of and is incorporated by reference in the disclosure of this application.

BACKGROUND

This specification relates to training text classification machine learning models.

Some text classification systems include neural networks, other types of machine learning models, or both for classifying input text samples. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how a system can train a text classification machine learning model to be robust to adversarial attacks.

In particular, during the training, the system receives a training text sample and a target classification for the training text sample, and generates a group of perturbed text samples using the training text sample by perturbing one or more words in the training text sample. The perturbed text samples are similar to the training text sample, but with minor changes, e.g., replacing a word with a synonym or introducing a minor typo.

Each text sample has a corresponding combined feature representation in an embedding space. The system determines a region in the embedding space occupied by the combined feature representations of the perturbed text samples, and trains the text classification machine learning model to assign the target classification of the training text sample for all combined feature representations in the region in the embedding space. In this way, the system can train the text classification machine learning model to be robust to a testing data set that includes a testing text sample that has a combined feature representation in the region in the embedding space, i.e., a testing text sample that is similar to the training text sample but that was not seen during training (e.g., was not one of the perturbed text samples).

In some implementations, the text classification machine learning model is a multi-class classifier that assigns a single classification from a group of classifications to a given text sample. In some other implementations, the text classification machine learning model is a binary classifier that predicts if a given text sample belongs to a particular classification of interest.

Particular embodiments of the subject matter described in this specification can be implemented so as to realize one or more of the following advantages.

The techniques described in this specification allow a system to train a text classification machine learning model to correctly classify new text samples after deployment that the model was not exposed to during training. Such robustness is particularly important in cases where an adversary, i.e., an entity that generates inputs that are processed by the model, may attempt to generate text samples that the model will classify incorrectly, and where classifying text samples incorrectly can have significant negative consequences. In other words, an adversary may wish to generate a text sample that a human would assign a particular classification, but that the text classification machine learning model will assign a different, incorrect classification.

The perturbed text samples generated by the system are similar to text samples that an adversary might generate, namely, text samples that are similar to a given training text input, but that the model did not process during training and therefore may classify incorrectly. The region in the embedding space occupied by the combined feature representations of the perturbed text samples includes combined feature representations of many text samples that are similar to the given training text input, including new text samples that are not in the group of perturbed text samples. These text samples all belong to the target classification of the given training text sample. By training the model to assign the target classification of the training text sample to any combined feature representation in the region, the system described in this specification allows the model to be robust to perturbations in the text samples provided after deployment, including perturbed text samples that were not in the set of perturbed text samples but that an adversary might generate.

As a particular example, the text classification model can be configured to classify a description of a software application, as a proxy for classifying the application itself. For example, the model can be a multi-class classifier that predicts a category for mobile applications, e.g., "Social Media," "Productivity," "Puzzle Game," etc., given the text description of the mobile applications. A system that publishes mobile applications to be downloaded by users, e.g., a system that maintains an app store or other digital distribution platform, can then list the mobile applications of the same category together in the store or platform. An adversary, however, might wish to publish an application in a different category than the category that is advertised in the text description of the application. That is, the adversary may attempt to generate a text description of the application i) that a user will recognize as a description of a first "true" type of application (e.g., "Social Media"), and ii) that the text classification model will classify as a different "target" type of application (e.g., "Productivity"). In some cases, the adversary might repeatedly submit a slightly-perturbed text sample of the application until the adversary discovers a text sample that the model does not classify as a description of an application of the "true" type, allowing the adversary to publish the application with the discovered description in a different category of applications than is proper.

There are many reasons an adversary might want a mobile application store to misclassify an application submitted by the adversary. For example, a particular category of applications might be more popular than other categories of applications. Therefore, if a submitted application is classified in the particular category and listed among other applications of the particular category, then the submitted application might be seen by more users of the application store, and therefore might be downloaded by more users of the application store, than if the submitted application had been classified in the "true" category of the submitted application.

As another example, an application store might rank the applications in each category, e.g., by publishing a "Top 10 Most Popular" list of applications in each category. Application in such a "Top 10" list might be downloaded by even more users as a result of being on the list. As a particular example, the application store might rank the applications in each category according to the number of times each application has been downloaded in the past week, month, or year. A particular category of applications might be less "competitive," i.e., there might be fewer high-performing applications in the particular category. Therefore, an adversary might wish a submitted application to be classified in the particular category, so that the application requires fewer weekly, monthly, or yearly downloads in order to be published on the "Top 10" list corresponding to the category.

However, misclassifying applications can be harmful to the integrity and security of the application store. For example, if users often see applications that are listed under an incorrect category, the users might lose faith in the application store and, e.g., mistrust the applications that are listed in the "Top 10" lists. Further, it can be a negative user experience to be viewing a particular category of application and consistently see applications that belong to a different category.

Using the methods described in this specification, a classification system of an application store can train a text classification model to be robust to small perturbations, allowing the model to correctly classify each text sample submitted by the adversary, thereby protecting users.

Existing techniques for adversarial training have largely focused on perturbing images to train image classification machine learning models to be more robust. Generally, existing adversarial training techniques allow for training a machine learning model using a particular region of an embedding space of the inputs to the machine learning model. Determining such a region of an embedding space for text inputs is not intuitive, and is more difficult than doing so for image inputs. In particular, the values for each pixel in an image have a continuous, or nearly-continuous, range, e.g., 0-255 for each channel. Thus, a slight perturbation of these values has a real-world intuitive effect on the image, e.g., the color of the pixels changes slightly. A text input, on the other hand, is a sequence of words taken from a discrete vocabulary. It is not intuitive how to slightly perturb the sentence while ensuring the result has a real-world semantic meaning. Further, if the embedding of a text input in an embedding space is perturbed, e.g., if the values in a high-dimensional vector corresponding to the text input are changed slightly, the resulting perturbed embedding is not guaranteed to have a corresponding perturbed text input. The methods described in this specification allow a system to determine a region in an embedding space of text samples and use the region for training the text classification machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can train a text classification machine learning model, also referred to in this specification as simply a "model," to be robust to adversarial inputs.

Figure 1:
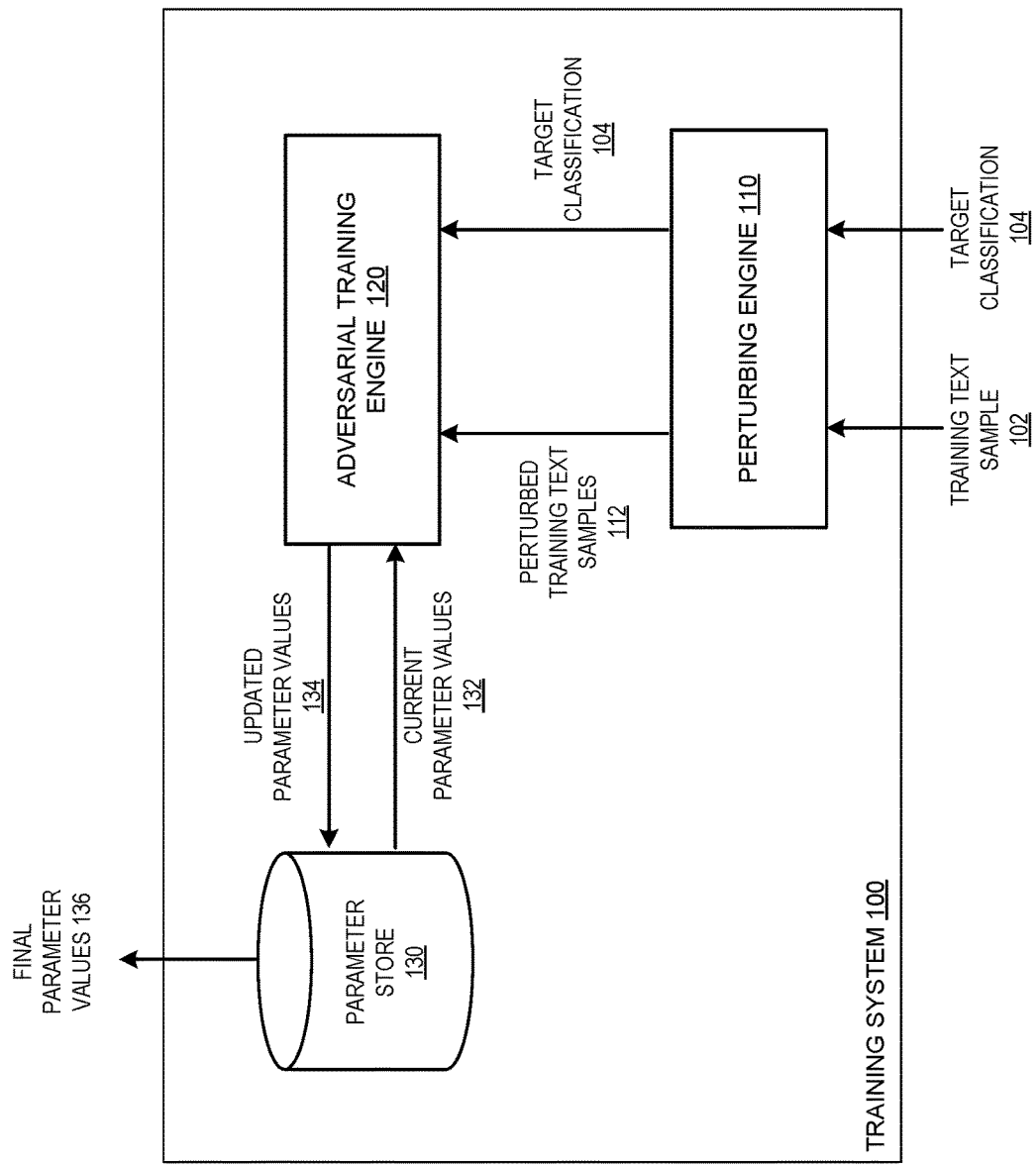
FIG. 1 is a diagram of an example training system.

FIG. 1 is a diagram of an example training system 100. The training system 100 is an example of a system implemented as computer programs on one or more computers in one or more locations in which the systems, components, and techniques described below are implemented.

The training system 100 is configured to train a text classification machine learning model, and includes a perturbing engine 110, an adversarial training engine 120, and a parameter store 130.

The text classification machine learning model receives as input combined feature representations of text samples that each include a sequence of words from a vocabulary, e.g., a vocabulary of words in a particular natural language. The model processes the combined feature representations of the text samples in accordance with current values of a set of model parameters to classify the text samples. For example, the text classification machine learning model can assign each text sample to a category according to the predicted semantic subject of the text sample, e.g., "Sports" or "Politics."

For each text sample to be classified by the text classification machine learning model, the system 100 maps the text sample to a corresponding combined feature representation in an embedding space. The model then processes the combined feature representation to generate the classification for the text sample. Each combined feature representation is an ordered collection of numeric values that represents an input in the embedding space. For example, the combined feature representation can be a vector of floating point or other numeric values that has a fixed dimensionality, i.e., a vector in an n-dimensional space, where n is a fixed integer, e.g., fifty, one hundred, or one thousand.

The system 100 can generate a combined feature representation of a text sample in the embedding space by combining word embeddings of the words in the text sample. Each word in a vocabulary of possible words can have a corresponding precomputed word embedding in a second embedding space (e.g., the same embedding space as the combined feature representation of the text sample). Examples of such precomputed word embeddings include word2vec (arXiv: 1301.3781) and GloVe (DOI: 10.3115/v1/D14-1162). As a particular example, the combined feature representation of the text sample can be the average of the respective word embeddings of the words in the text sample. As another particular example, the system 100 can generate the combined feature representation of the text sample by processing the word embeddings of the words in the text sample using a neural network that is configured to process a sequence of word embeddings to generate a combined feature representation, e.g., a long short-term memory (LSTM) neural network or other recurrent neural network.

As a particular example of a text classification machine learning model, the model can be configured to classify a description of a software application. As described above, a system that publishes software applications to be downloaded by users, e.g., a system that maintains an app store or other digital distribution platform, can use such a text classification machine learning model to ensure that each published software application is listed under the correct category, according to the text description of the application.

As another particular example, the text classification machine learning model can be configured to classify a description of a video; e.g., the model can classify a given text sample that describes a video into one of multiple categories, e.g., "Sports," "Entertainment," "Comedy," etc. A system that publishes videos to be viewed by viewers, e.g., a social media website that allows users to post user-created videos, can use such a text classification machine learning model to label videos as belonging to a particular category, and group similar videos.

As another particular example, the text classification machine learning model can be configured to classify digital advertisements that contain text; e.g., the model can be a classifier that classifies a given textual advertisement into one of multiple categories, e.g., "Fashion," "Furniture," "Makeup," etc. A system that displays digital advertisements can use such a text classification machine learning model to match advertisements that are displayed adjacent to content with the content itself. For example, the system can place an advertisement for makeup next to a video tutorial for applying makeup.

The training system 100 trains the text classification machine learning model on a set of training data.

The training data includes multiple training text samples, each of which has a corresponding target classification. The target classification for a given training text sample is the ground-truth classification of the training text sample, i.e., the classification that should be generated by the text classification machine learning model in response to processing the combined feature representation of the training text sample.

The training system 100 trains the text classification machine learning model by adjusting the values of the model parameters to minimize a loss function that measures errors between classifications generated by the text classification machine learning model and target classifications for the training text samples. For example, if the text classification machine learning model is a binary classifier for a given category of interest that receives a combined feature representation of a text sample and generates a predicted probability between 0 and 1 that characterizes the likelihood that the text sample belongs to the category of interest, then the loss function can be the cross-entropy loss function, which can be calculated as:

$$-(y \log(p)+(1-y)\log(1-p)),$$

where y is the target classification, i.e., y equals either 0 or 1 indicating whether the text sample belongs to the category of interest, and p is the predicted probability generated by the model.

Referring to FIG. 1, during the training, the training system 100 receives as input a training text sample 102 and a target classification 104.

The perturbing engine 110 receives the training text sample 102 and generates multiple perturbed training text samples 112. The perturbed training text samples 112 are similar to the training text sample 102 but with minor differences. For instance, the perturbing engine 110 can generate a perturbed training text sample by selecting two words in the training text sample 102, replacing the first selected word in the training text sample 102 with a synonym of the first selected word, and introducing a minor typo to the second selected word. An example process for generating perturbed text samples is described in more detail below with reference to FIG. 3.

The training system 100 provides the perturbed training text samples 112 and the target classification 104 as input to the adversarial training engine 120. The adversarial training engine 120 also receives current parameter values 132 of the text classification machine learning model from the parameter store 130. The adversarial training engine 120 updates the parameter values 132 using the perturbed training text samples 112 and the target classification 104, generating updated parameter values 134. The adversarial training engine 120 provides the updated parameter values 134 to the parameter store 130, which stores the most recent parameter values.

After the system 100 has completed training of the text classification machine learning model, the parameter store 130 can output the final parameter values 136, e.g., by providing the final parameter values 136 to a system that executes the trained text classification machine learning model. Alternatively or in addition, the system 100 can, after training, use the trained text classification machine learning model to classify new text inputs.

As described above, each text sample, including the perturbed training text samples 112 and the training text sample 102, has a corresponding combined feature representation in an embedding space. The combined feature representations can have the property that text samples that are semantically similar, i.e., text samples that have a similar meaning, are close to each other in the embedding space. Two combined feature representations can be considered "close" if a measure of distance between them is small, e.g., an $l_1$ distance or $l_2$ distance. As a particular example, the combined feature representation for "quick" might be close in the embedding space to the combined feature representation for "swift." As another particular example, the combined feature representation for "I ran across the road" might be close in the embedding space to the combined feature representation for "I sprinted across the street."

In order to update the parameter values 132, the adversarial training engine 120 determines a region in the embedding space, and trains the text classification machine learning model to assign the target classification 104 to all text samples whose combined feature representations are in the region. For example, the region in the embedding space can be a region that contains all of the perturbed training text samples 112 (and, optionally, the training text sample 102). In this example, the adversarial training engine 120 can train the text classification machine learning model to assign the target classification 104 to all of the perturbed training text samples 112, as well as other text samples whose combined feature representations are near the combined feature representations of the perturbed training text samples 112. The adversarial training engine 120 can use the determined region to update the parameters of the text classification machine learning model using any appropriate adversarial training technique. Example techniques are described below with reference to FIG. 2.

In this way, the adversarial training engine 120 can train the text classification machine learning model to assign the same classification to similar text samples, where text samples are considered "similar" if their combined feature representations are close to each other in the embedding space. An example region in an embedding space that has been determined using perturbed text samples is discussed in more detail below with reference to FIG. 2.

Figure 2:
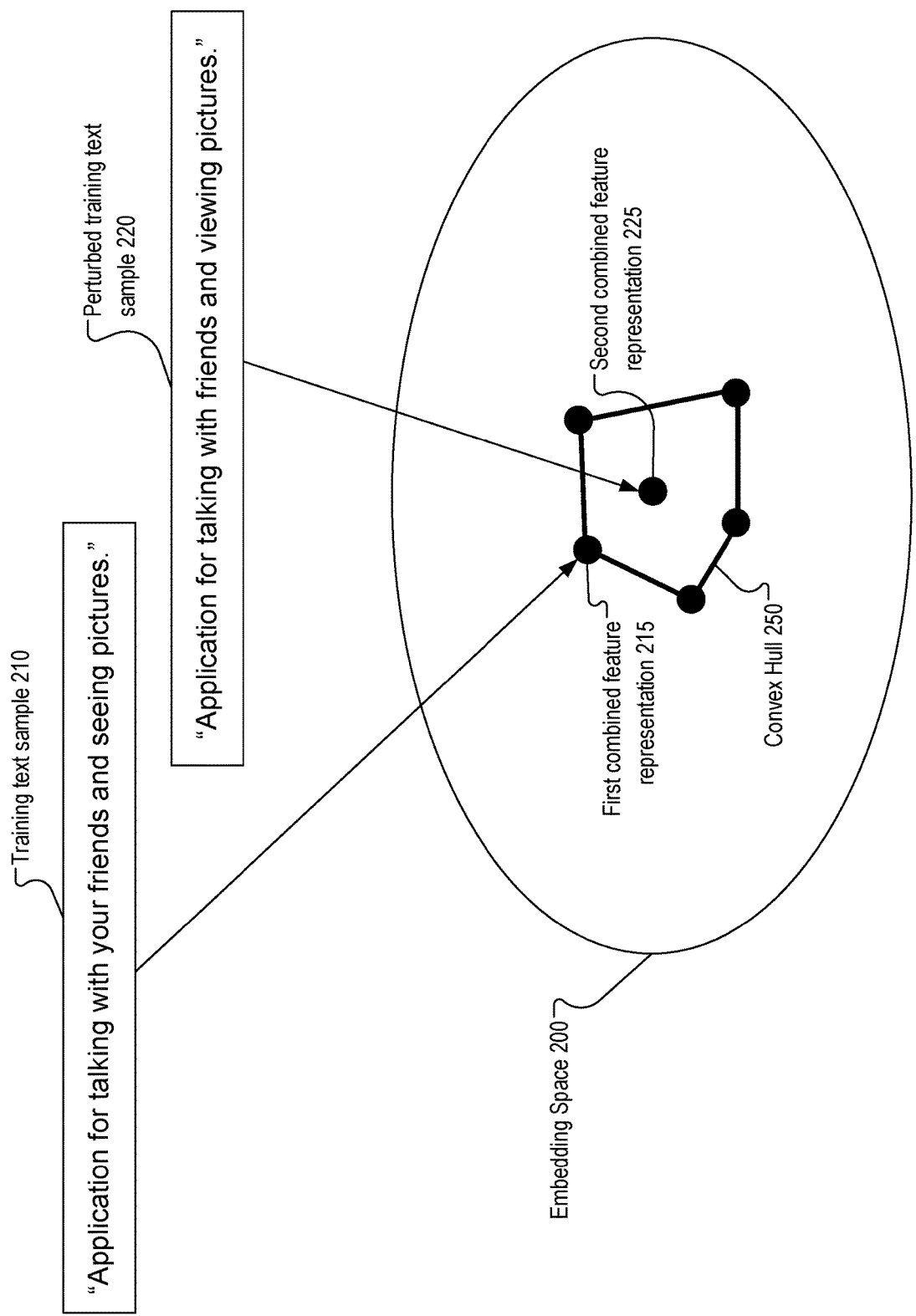
FIG. 2 is an illustration of an example embedding space.

FIG. 2 is an illustration of an example embedding space 200.

The embedding space 200 contains combined feature representations for every possible text sample that can be generated using a particular vocabulary. For example, the combined feature representations can be n-dimensional vectors, and the embedding space 200 can be the space of n-dimensional vectors or a subset of the space of n-dimensional vectors that includes the embeddings of all of the text samples that can be generated using the vocabulary. The vocabulary can include a group of words, e.g., every word in the Oxford English Dictionary.

A training text sample 210 reads, "Application for talking with your friends and seeing pictures."

A perturbed training text sample 220 reads, "Application for talking with friends and viewing pictures." The perturbed training text sample 220 is a perturbed version of the training text sample 210. For example, the perturbed training text sample 220 can be generated by a perturbing engine using the training text sample 210, e.g., by the perturbing engine 110 depicted in FIG. 1. In this case, the perturbing engine selected the words "seeing" and "your" from the training text sample 210. The perturbing engine replaced the first selected word "seeing" with the synonym "viewing" and removed the second selected word "your" to generate the perturbed training text sample 220. An example process for perturbing a training text sample is discussed in more detail below with reference to FIG. 3.

During training of a text classification machine learning model, a training system, e.g., the training system 100 depicted in FIG. 1, can provide a group of text samples including the training text sample 210 and the perturbed training text sample 220 to an adversarial training engine, e.g., the adversarial training engine 120 depicted in FIG. 1. The adversarial training engine can determine a combined feature representation in the embedding space 200 for each of the text samples. In particular, the adversarial training engine determines a first combined feature representation 215 for the training text sample 210 and a second combined feature representation 225 for the perturbed training text sample 220. Because the two text samples 210 and 215 are semantically similar, the first combined feature representation 215 and the second combined feature representation 225 are close to each other in the embedding space 200.

For example, as described above, the adversarial training engine can combine word embeddings in the embedding space 200 of the respective words in the text samples to determine the combined feature representations of the text samples, e.g., by determining the average of the word embeddings or by processing each of the word embeddings using a neural network.

In some cases, one of the text samples might include words that are not in the vocabulary, i.e., words that do not have a corresponding precomputed word embedding. For example, a word that includes a typo might not be in the vocabulary, e.g., "Wendesday." As another example, there may be very rare words, called "out-of-vocabulary words," that are correctly spelled but are not in the vocabulary, e.g., "wherefore." In some implementations, when the text sample includes a new word that is not in the vocabulary, the adversarial training engine can ignore the new word in the text sample, e.g., by determining the combined feature representation of the text sample to be the average of the word embeddings of all words in the text sample except the new word. In some other implementations, the adversarial training engine can determine a word that is in the vocabulary that is most similar to the new word; e.g., the similar word can be the word in the vocabulary that requires the fewest single-character edits to change the similar word into the new word. The adversarial training engine can then use the word embedding of the similar word as the word embedding of the new word.

After determining the combined feature representations of the text samples, the adversarial training engine determines a region in the embedding space 200. The region in the embedding space corresponds to text samples that are similar to the training text sample 210, e.g., the perturbed training text sample 220. For example, the determined region in the embedding space 200 can be the convex hull 250 of the combined feature representations. A convex hull of a set of points in an embedding space is the smallest region in the embedding space whereby every line segment between any two points in the set is completely contained in the region. There are several algorithms for finding the exact convex hull of a set of high-dimensional points, e.g., "An Optimal Convex Hull Algorithm in Any Fixed Dimension," Bernard Chazelle, doi: 10.1007/BF02573985. There are also several algorithms that approximate the convex hull of a set of high-dimensional points more efficiently than computing the convex hull exactly, e.g., "Computing the Approximate Convex Hull in High Dimensions," Hossein Sartipizadeh and Tyrone L. Vincent, arXiv: 1603.04422v1.

After determining the region 250 in the embedding space 200, the adversarial training engine trains the text classification machine learning model to assign the same target classification to every combined feature representation in the region 250. The target classification can be a predetermined target classification of the training text sample 210, e.g., "Social Media Application." In particular, the adversarial training engine can perform this training using any appropriate adversarial training technique.

For example, the adversarial training engine can determine one or more "worst" combined feature representations in the region 250. A worst combined feature representation is a combined feature representation on which the text classification machine learning model performs poorly. In particular, the worst combined feature representations have a large measure of error, where a measure of error for a combined feature representation is a measure of a difference between the target classification for the combined feature representation and the classification that the model generates for the combined feature representation.

To determine a worst combined feature representation in the region 250, the adversarial training engine can perform gradient descent. That is, the adversarial training engine can select a first combined feature representation in the region, e.g., the combined feature representation of one of the text samples or a randomly-selected combined feature representation in the region. Then, the adversarial training engine can perform one or more gradient descent steps to select respective intermediate combined feature representations that have a larger measure of error than the respective previous combined representation.

$$\theta^1 \leftarrow \theta^0 + \alpha \nabla J(\theta)$$

The above equation characterizes a single gradient descent step, where $\theta^0$ and $\theta^1$ are the combined feature representations at a first and second time step, respectively, and $J(\theta)$ is the loss function used for the training of the text classification machine learning model. The adversarial training engine can process the combined feature representation $\theta^0$ at the first time step using the text classification machine learning model and determine $\nabla J(\theta)$, which is the direction in the region 250 in the embedding space 200 that will increase the error of the model the most, using backpropagation. The adversarial training engine can then take an incremental step in that direction to determine the combined feature representation $\theta^1$ at the second time step, where the size of the incremental step is defined by the step size a. Note that the above equation differs from conventional gradient descent in two ways: i) $\nabla J(\theta)$ is computed with respect to the input combined feature representations $\theta$ instead of the model parameters, and ii) $\alpha \nabla J(\theta)$ is added to $\theta^0$ instead of subtracted, because the goal is to maximize, rather than minimize, the loss. Thus, this process can also be described as gradient ascent.

The adversarial training engine can select the worst combined feature representation after the final gradient descent step. For example, the adversarial training engine can determine to end the process after a predetermined number of steps. As another example, the adversarial training engine can determine to end the process after a marginal increase in the loss function $J(\theta)$ between subsequent combined feature representations drops below a predetermined threshold, indicating that a global or local maximum of the loss function has been achieved.

After determining the one or more worst combined feature representations, the adversarial training engine can train the text classification machine learning model using the determined worst combined feature representations. For example, the adversarial training engine can process the worst combined feature representations using the text classification machine learning model, and determine an update to the parameters of the model using the measure of error (as measured by the loss function) of the worst combined feature representations. That is, the adversarial training engine can train the text classification machine learning model using the worst combined feature representations as if the worst combined feature representations were conventional training examples. For example, the adversarial training engine can determine an update to the parameters of the model using backpropagation and gradient descent.

Figure 3:
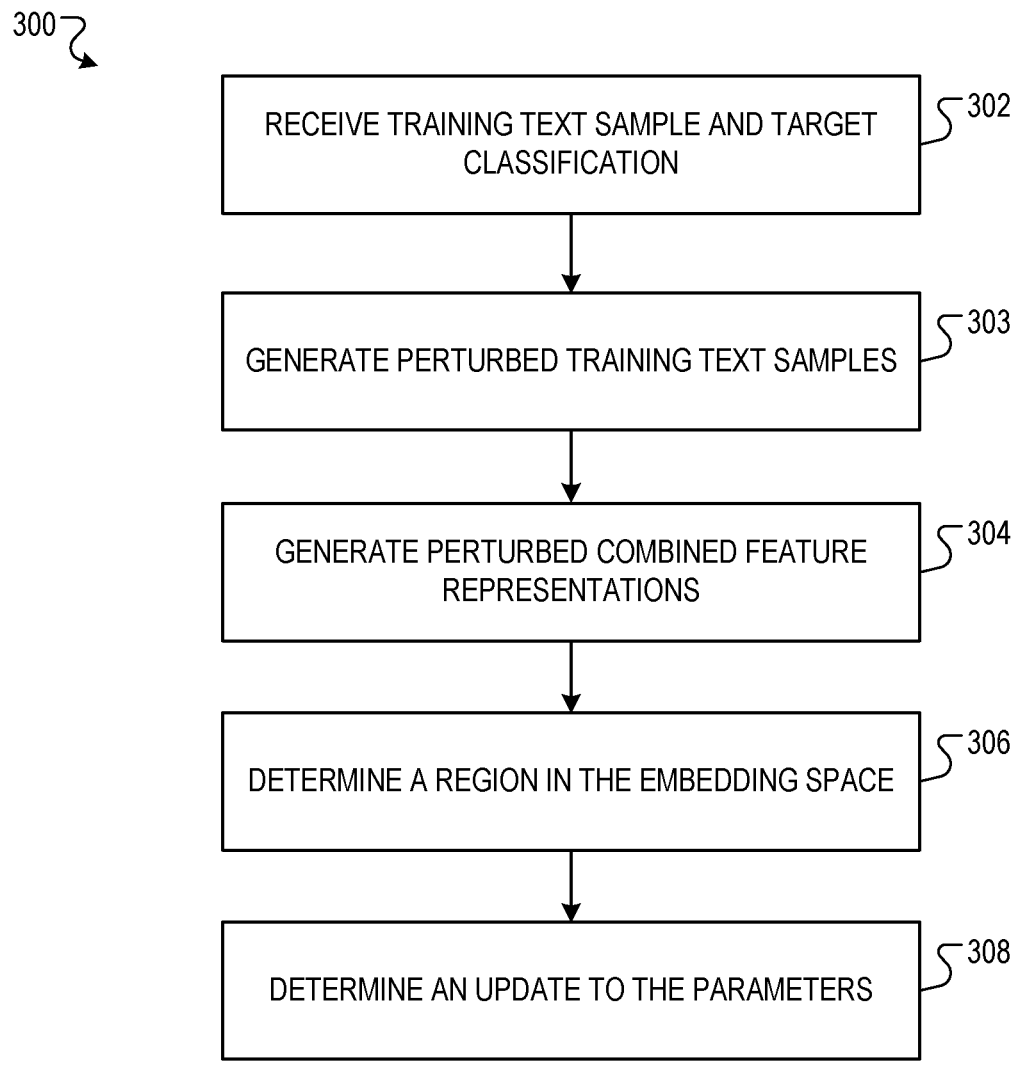
FIG. 3 is a flow diagram of an example process for determining an update to the parameters of a text classification machine learning model.

FIG. 3 is a flow diagram of an example process 300 for determining an update to the parameters of a text classification machine learning model. For convenience, the process 300 will be described as being performed by a system of one or more computers located in one or more locations. For example, a training system, e.g., the training system 100 depicted in FIG. 1, appropriately programmed in accordance with this specification, can perform the process 300.

The system receives a training text sample and a target classification (302). The target classification is the ground-truth label of the training text sample, i.e., the classification that should be generated by the text classification machine learning model in response to processing the training text sample.

The system generates a group of perturbed training text samples (303). To generate a perturbed training text sample, the system can select one or more words in the training text sample, and determine a perturbed word for each selected word. The system then replaces each selected word with the respective perturbed word to generate the perturbed training text sample.

For example, the system can select, as the perturbed word, a word whose word embedding in the embedding space is close to the word embedding of the selected word. As discussed above, embeddings in the embedding space can have the property that words whose embeddings are close in the embedding space have a similar semantic meaning. Thus, the perturbed word is similar to the selected word.

As another example, the system can select, as the perturbed word, a word that is a synonym of the selected word in a thesaurus. Thus, the perturbed word is similar to the selected word.

As another example, the system can perturb the selected word by introducing one or more typos into the word. As a particular example, the system can process the word using a sequence of single-character edits, e.g., insertions, deletions, or substitutions of characters. These single-character edits can be random. As a particular example, the system can process the selected word "modifications" to generate the perturbed word "modifficatons" by inserting the character 'f' and deleting the character 'i.' The generated perturbed word is similar to the selected word; e.g., a human might be able to disambiguate the perturbed word and understand what was meant.

As another example, the system can select a 'null' word as the perturbed word for a selected word. That is, the system removes the selected word from the text sample. If the word was not syntactically necessary, then the text sample without the selected word is similar to the text sample with the selected word.

Instead or in addition to replacing selected words with corresponding perturbed words, the system can insert one or more words into the training text sample to generate the perturbed training text sample. As a particular example, the system might insert the word "very" into the training text sample "The meal tasted good" to generate the perturbed training text sample "The meal tasted very good." Such an insertion does not significantly change the semantic meaning of the text sample.

The system generates a respective perturbed combined feature representation for each perturbed training text sample (304). For example, the system can determine the perturbed combined feature representation by combining the word embeddings of some or all of the words in the perturbed text sample. For example, the system can combine the word embeddings of i) words in the perturbed text sample that were selected and perturbed, ii) words in the perturbed text sample that were not selected and therefore are the same as in the original text sample, or iii) both.

The system determines a region in the embedding space (306). For example, the region can be a region in the embedding space that contains all of the perturbed combined feature representations, e.g., the convex hull of the perturbed combined feature representations.

The system determines an update to the parameters of the text classification machine learning model (308). The update is based on an adversarial objective that encourages the machine learning model to assign the target classification for all of the combined feature representations in the region in the embedding space. For example, the system can determine one or more "worst" combined feature representations in the region, and train the text classification machine learning model using the worst combined feature representations, i.e., by determining a gradient of the loss function with respect to the model parameters when evaluated at each worst combined feature representation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In addition to the embodiments described above, the following embodiments are also innovative:

Embodiment 1 is a method of training a machine learning model having a plurality of parameters and configured to generate a classification of a text sample comprising a plurality of words by processing a model input that includes a combined feature representation of the plurality of words in the text sample, wherein the combined feature representation is a representation in an embedding space, wherein the training comprises:

receiving a training text sample and a target classification for the text sample;

generating a plurality of perturbed combined feature representations, wherein each perturbed combined feature representations is a representation in the embedding space, and wherein generating each of the perturbed combined feature representations comprises:

selecting one or more words in the training text sample;

generating a perturbed training text sample by determining a respective perturbed word for each selected word; and generating a combined feature representation of the perturbed training text sample;

determining, based on the plurality of perturbed combined feature representations, a region in the embedding space; and determining an update to the parameters based on an adversarial objective that encourages the machine learning model to assign the target classification for the training text sample for all of the combined feature representations in the region in the embedding space.

Embodiment 2 is the method of embodiment 1, wherein determining a perturbed word for a selected word comprises selecting a perturbed word that has a combined feature representation that is close to the combined feature representation of the selected word in the embedding space.

Embodiment 3 is the method of any one of embodiments 1 or 2, wherein determining a perturbed word for a selected word comprises selecting a perturbed word that is a synonym of the selected word in a thesaurus.

Embodiment 4 is the method of any one of embodiments 1-3, wherein determining a perturbed word for a selected word comprises processing the selected word using a sequence of one or more single-character edits, wherein the sequence of single-character edits comprises one or more of:
  insertions;
  deletions; or
  substitutions.

Embodiment 5 is the method of embodiment 1, wherein generating a perturbed training text example comprises removing one or more of the selected words from the training text sample.

Embodiment 6 is the method of any one of embodiments 1-5, wherein:
  each word in a vocabulary of words has a word embedding, and
  generating a combined feature representation of the perturbed training text sample comprises combining word embeddings of one or more perturbed words that are in the vocabulary.

Embodiment 7 is the method of any one of embodiments 1-6, wherein:
  each word in a vocabulary of words has a word embedding, and
  generating the combined feature representation of the perturbed training text sample comprises combining word embeddings of unselected words in the respective text sample that are in the vocabulary.

Embodiment 8 is the method of any one of embodiments 1-7, wherein each combined feature representation of a text sample is a measure of central tendency of word embeddings of the words in the text sample.

Embodiment 9 is the method of any one of embodiments 1-8, wherein the region in the embedding space is a convex hull of the perturbed combined feature representations.

Embodiment 10 is the method of any one of embodiments 1-9, wherein determining an update to the parameters based on an adversarial objective that encourages the model to assign the target classification for all combined feature representations in the region in the embedding space comprises:
  determining one or more worst combined feature representations in the region in the embedding space, wherein a worst combined feature representation has a large measure of error, wherein the measure of error for a combined feature representation is a measure of a difference between the target classification of the combined feature representation and a classification of the combined feature representation generated by the model; and
  determining an update to the parameters using the worst combined feature representations.

Embodiment 11 is the method of embodiment 10, wherein determining a worst combined feature representation in the region in the embedding space comprises:
  selecting a first combined feature representation in the region;
  performing one or more gradient descent steps to select respective intermediate combined feature representations in the region that have a larger measure of error than previous combined feature representations; and
  selecting the worst combined feature representation after a final gradient descent step.

Embodiment 12 is the method of any one of embodiments 10 or 11, wherein determining an update to the parameters using the worst combined feature representations comprises:
  processing the worst combined feature representations using the machine learning model; and
  determining an update to the parameters using the measure of error of the worst combined feature representations.

Embodiment 13 is the method of any one of embodiments 1-12, wherein:
  each text sample comprises text that describes an application, and
  the model is configured to classify a type of the application, wherein the model is either i) a multi-class classifier for a plurality of application types or ii) a binary classifier for a particular type of interest.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 13.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of training a machine learning model having a plurality of parameters and configured to generate a classification of a text sample comprising a plurality of words by processing a model input that includes a combined feature representation of the plurality of words in the text sample, wherein the combined feature representation is a representation in an embedding space,
  wherein the training comprises:
    receiving a training text sample and a target classification for the training text sample;
    generating a plurality of perturbed combined feature representations, wherein each perturbed combined feature representation is a representation in the embedding space, and wherein generating each of the perturbed combined feature representations comprises:
      selecting one or more words in the training text sample;
      generating a perturbed training text sample by determining a respective perturbed word for one or more of the selected words; and
      generating a perturbed combined feature representation of the perturbed training text sample by combining respective word embeddings of each word in the perturbed training text sample;
    determining, based on the plurality of perturbed combined feature representations, a region in the embedding space; and
    determining an update to the parameters based on an adversarial objective that encourages the machine learning model to assign the target classification for the training text sample to all of the combined feature representations in the region in the embedding space.

2. The method of claim 1, wherein determining a perturbed word for a selected word comprises selecting a perturbed word that has a representation that is close to a representation of the selected word in the embedding space.

3. The method of claim 1, wherein determining a perturbed word for a selected word comprises selecting a perturbed word that is a synonym of the selected word in a thesaurus.

4. The method of claim 1, wherein determining a perturbed word for a selected word comprises processing the selected word using a sequence of one or more single-character edits, wherein the sequence of single-character edits comprises one or more of:
one or more insertions;
one or more deletions; or
one or more substitutions.

5. The method of claim 1, wherein generating a perturbed training text example comprises removing one or more of the selected words from the training text sample so that the perturbed training text example includes fewer words than the training text sample.

6. The method of claim 1, wherein:
each word in a vocabulary of words has a word embedding, and
generating a combined feature representation of the perturbed training text sample comprises combining word embeddings of one or more perturbed words that are in the vocabulary.

7. The method of claim 1, wherein:
each word in a vocabulary of words has a word embedding, and
generating the combined feature representation of the perturbed training text sample comprises combining word embeddings of unselected words in the respective training text sample that are in the vocabulary.

8. The method of claim 1, wherein each combined feature representation of a text sample is a measure of central tendency of word embeddings of the words in the text sample.

9. The method of claim 1, wherein the region in the embedding space is a convex hull of the perturbed combined feature representations.

10. The method of claim 1, wherein determining an update to the parameters based on an adversarial objective that encourages the model to assign the target classification for all combined feature representations in the region in the embedding space comprises:
determining one or more worst combined feature representations in the region in the embedding space, wherein a worst combined feature representation has a large measure of error, wherein the measure of error for a combined feature representation is a measure of a difference between the target classification of the combined feature representation and a classification of the combined feature representation generated by the machine learning model; and
determining an update to the parameters using the worst combined feature representations.

11. The method of claim 10, wherein determining a worst combined feature representation in the region in the embedding space comprises:
selecting a first combined feature representation in the region;
performing one or more gradient ascent steps to select respective intermediate combined feature representations in the region that have a larger measure of error than previous combined feature representations; and
selecting the worst combined feature representation after a final gradient ascent step.

12. The method of claim 10, wherein determining an update to the parameters using the worst combined feature representations comprises:
processing the worst combined feature representations using the machine learning model; and
determining an update to the parameters using the measure of error of the worst combined feature representations.

13. The method of claim 1, wherein:
each text sample comprises text that describes a software application, and
the machine learning model is configured to classify a type of the software application, wherein the model is either i) a multi-class classifier for a plurality of software application types or ii) a binary classifier for a particular type of interest.

14. A system comprising one or more computers and one or more storage devices storing instructions that are operable, when executed by the one or more computers, to cause the one or more computers to perform a method of training a machine learning model having a plurality of parameters and configured to generate a classification of a text sample comprising a plurality of words by processing a model input that includes a combined feature representation of the plurality of words in the text sample, wherein the combined feature representation is a representation in an embedding space,
wherein the training comprises:
receiving a training text sample and a target classification for the training text sample;
generating a plurality of perturbed combined feature representations, wherein each perturbed combined feature representation is a representation in the embedding space, and wherein generating each of the perturbed combined feature representations comprises:
selecting one or more words in the training text sample;
generating a perturbed training text sample by determining a respective perturbed word for one or more of the selected words; and
generating a perturbed combined feature representation of the perturbed training text sample by combining respective word embeddings of each word in the perturbed training text sample;
determining, based on the plurality of perturbed combined feature representations, a region in the embedding space; and
determining an update to the parameters based on an adversarial objective that encourages the machine learning model to assign the target classification for the training text sample to all of the combined feature representations in the region in the embedding space.

15. The system of claim 14, wherein determining a perturbed word for a selected word comprises selecting a perturbed word that has a combined feature representation that is close to the combined feature representation of the selected word in the embedding space.

16. The system of claim 14, wherein determining a perturbed word for a selected word comprises selecting a perturbed word that is a synonym of the selected word in a thesaurus.

17. The system of claim 14, wherein determining a perturbed word for a selected word comprises processing the selected word using a sequence of one or more single-character edits, wherein the sequence of single-character edits comprises one or more of:

one or more insertions;

one or more deletions; or one or more substitutions.

18. The system of claim 14, wherein generating a perturbed training text example comprises removing one or more of the selected words from the training text sample.

19. One or more non-transitory computer storage media encoded with computer program instructions that when executed by a plurality of computers cause the plurality of computers to perform a method of training a machine learning model having a plurality of parameters and configured to generate a classification of a text sample comprising a plurality of words by processing a model input that includes a combined feature representation of the plurality of words in the text sample, wherein the combined feature representation is a representation in an embedding space, wherein the training comprises:

receiving a training text sample and a target classification for the training text sample;

generating a plurality of perturbed combined feature representations, wherein each perturbed combined feature representation is a representation in the embedding space, and wherein generating each of the perturbed combined feature representations comprises:

selecting one or more words in the training text sample;

generating a perturbed training text sample by determining a respective perturbed word for one or more of the selected words; and generating a perturbed combined feature representation of the perturbed training text sample by combining respective word embeddings of each word in the perturbed training text sample;

determining, based on the plurality of perturbed combined feature representations, a region in the embedding space; and determining an update to the parameters based on an adversarial objective that encourages the machine learning model to assign the target classification for the training text sample to all of the combined feature representations in the region in the embedding space.

20. The non-transitory computer storage media of claim 19, wherein determining a perturbed word for a selected word comprises selecting a perturbed word that has a combined feature representation that is close to the combined feature representation of the selected word in the embedding space.

\* \* \* \* \*